United States Patent
Bhogal et al.

(10) Patent No.: US 10,548,013 B2
(45) Date of Patent: Jan. 28, 2020

(54) SECURITY OF SHARED CREDENTIALS IN CROWDSOURCED WIRELESS NETWORKS

(71) Applicant: International Business Machines Corporation, Armonk, NY (US)

(72) Inventors: Kulvir S. Bhogal, Fort Worth, TX (US); Gregory J. Boss, Saginaw, MI (US); Rick A. Hamilton, II, Charlottesville, VA (US); Christopher D. Wyble, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 15/450,845

(22) Filed: Mar. 6, 2017

(65) Prior Publication Data

US 2018/0255461 A1    Sep. 6, 2018

(51) Int. Cl.
*H04W 12/08*    (2009.01)
*H04L 29/06*    (2006.01)

(52) U.S. Cl.
CPC ........... *H04W 12/08* (2013.01); *H04L 63/104* (2013.01)

(58) Field of Classification Search
None
See application file for complete search history.

(56) References Cited

U.S. PATENT DOCUMENTS

| | | | |
|---|---|---|---|
| 8,464,315 B2 | 6/2013 | Ahtisaari | |
| 8,959,086 B2 | 2/2015 | Bastide et al. | |
| 2005/0050158 A1* | 3/2005 | Solari | G06Q 10/10 709/217 |
| 2010/0161369 A1* | 6/2010 | Farrell | G06Q 10/10 705/319 |
| 2010/0161662 A1* | 6/2010 | Jonas | G06Q 10/107 707/780 |
| 2011/0238763 A1 | 9/2011 | Shin et al. | |
| 2012/0110640 A1* | 5/2012 | Donelson | H04L 63/102 726/3 |
| 2012/0266217 A1 | 10/2012 | Kaal et al. | |
| 2013/0212173 A1 | 8/2013 | Carthcart et al. | |
| 2014/0317676 A1* | 10/2014 | Nair | H04L 63/101 726/1 |
| 2016/0259789 A1 | 9/2016 | Shrinath et al. | |
| 2017/0019409 A1* | 1/2017 | Shalunov | H04L 12/6418 |

* cited by examiner

*Primary Examiner* — Henry Tsang
(74) *Attorney, Agent, or Firm* — Scully, Scott, Murphy & Presser, P.C.; Brian Restauro, Esq.

(57) ABSTRACT

A method, system and computer program product are disclosed for sharing a crowd sourced wireless network, wherein a first user uses a first device to access a wireless network, and the first device includes an application to grant automatically access to the wireless network to all of a defined group of people. In an embodiment, the method comprises restricting the automatic grant of access to the wireless network by, when one person of said group of people requests access to the network, a network control obtaining a determined strength of a defined relationship between the first user and that person, and granting the person access to the wireless network only if the determined strength of the defined relationship meets one or more set criteria. In an embodiment, the first device uploads a series of relationship scores to a server, and network control receives these scores from the server.

19 Claims, 3 Drawing Sheets

| Device ID | Relationship strength | Email message headers score | SMS/MMS headers score | Facebook score | Skype score | outlook.com score | Recency score | Shared location score | Frequency score |
|---|---|---|---|---|---|---|---|---|---|
| 000000000 | 25 | 5 | 2 | 1 | 1 | 1 | 5 | 5 | 5 |
| 000000001 | 12 | 0 | 5 | 0 | 1 | 0 | 3 | 2 | 1 |
| 000000002 | 10 | 2 | 2 | 1 | 0 | 0 | 3 | 0 | 2 |
| ... | ... | ... | ... | ... | ... | ... | ... | ... | ... |
| 00000000n | 14 | 2 | 3 | 1 | 1 | 1 | 0 | 2 | 4 |

FIG. 2

SECURITY OF SHARED CREDENTIALS IN CROWDSOURCED WIRELESS NETWORKS

BACKGROUND

This invention generally relates to crowd sourced wireless networks, and more specifically, to improved security in crowd sourced wireless networks.

Crowd sourced networking, in which wireless networks are shared by multiple users, has become common. The shared network may be a public network or a restricted network that is accessible to, for example, customers in a store, or people in a particular location such as a hotel or airport.

Individuals who own or administer their own wireless networks, for example in their home or residence, may also share their networks with others. Typically, in order to allow access to such a network, the owner or administrator of the network give a password to a person and that person inputs the password using his or her own computer in order to log onto the network.

Systems and procedures have been recently developed that allow people to share their wireless networks, or wireless networks to which they are connected, with other people without requiring these other people to input manually any password to log onto the networks. With this technology, if a particular social media relationship or connection exists between two users, the computer system of a first user may automatically grant to the computer system of the second user access to a wireless network that the first user owns or is connected to.

SUMMARY

Embodiments of the invention provide a method, system and computer program product for sharing a crowd sourced wireless network, wherein a first user uses a first device to access a specified wireless network, and the first device includes an application to grant automatically access to the specified wireless network to all of a defined group of people. In an embodiment, the method comprises restricting said automatic grant of access to the specified wireless network by, when one person of said group of people requests access to the specified wireless network, a network control obtaining a determined strength of a defined relationship between the first user and said one person, and granting said one person access to the specified wireless network only if the determined strength of the defined relationship meets one or more set criteria.

In an embodiment, the first device uploads a series of relationship strength scores to a server; and obtaining the determined strength of a defined relationship between the first user and said one person of the group of people includes the network control receiving said series of relationship strength scores from said server.

Embodiments of the invention allow users of devices having automated crowd sourced networking features to use additional information for the purpose of determining the strength of a relationship with a contact, before sharing a wireless network with that contact.

In embodiments of the invention, this additional information is used to calculate a relationship score, which is uploaded to cloud service connected to a router or wireless access point via the Internet. The router or access point downloads and caches a table of relationship scores which are used to evaluate requests for network access.

Embodiments of the invention determine which of a person's social media friends should be included in an automated crowd sourced networking technology.

Embodiments of the invention allow wireless network administrators, or end users, to set required threshold values to be met in order to give other users automated access to the wireless network.

Embodiments of the invention provide advances to ensure that all social network connections are not viewed as equally valid. In embodiments of the invention, when an authentication credential exchange is considered between two users, factors such as personal communication history, depth of shared social network, etc, are referenced. When the richness of this relationship is deemed to be above the required threshold, the authentication is granted. However, when the same examination is performed between two users, where the second user's social network invitation was accepted by the first user, although that first user did not know the second user, the examination may now determine that the relationship between the users does not meet the required threshold. Thus, the shared authentication credentials will not be provided.

Embodiments of the invention provide a means of balancing security and convenience.

BRIEF DESCRIPTION OF THE SEVERAL VIEWS OF THE DRAWINGS

FIG. 2 shows a relationship strength table that may be used in the method and system of FIG. 1

DETAILED DESCRIPTION

This invention relates to improved security in crowd sourced wireless networks. As discussed above, crowd sourced networks, in which wireless networks are shared by multiple users, have become common; and recently, systems and procedures have been developed that allow people to share their wireless networks, or wireless networks to which they are connected, with other people without requiring that these other people manually input any password to access the networks. If a particular relationship or connection exists between two users, the computer system of a first user may automatically grant to the computer system of the second user access to a wireless network that the first user owns, administers, or is connected to. This may be done by automatically passing authentication credentials or an authentication key from the computer system of the first user to the computer system of the second user.

This raises security concerns for many users about providing network access too broadly. For instance, two users who may be acquaintances at best, or simply strangers who have connected on social media at worst, can in effect provide network authentication capabilities to each other without knowledge of how this network will be used. The acceptance of a social network connection without personal knowledge of a person's intent or goodwill, followed by the exchange of a network credential can result in malicious activity being conducted on the network that the first user owns or is connected to.

Figure 1:
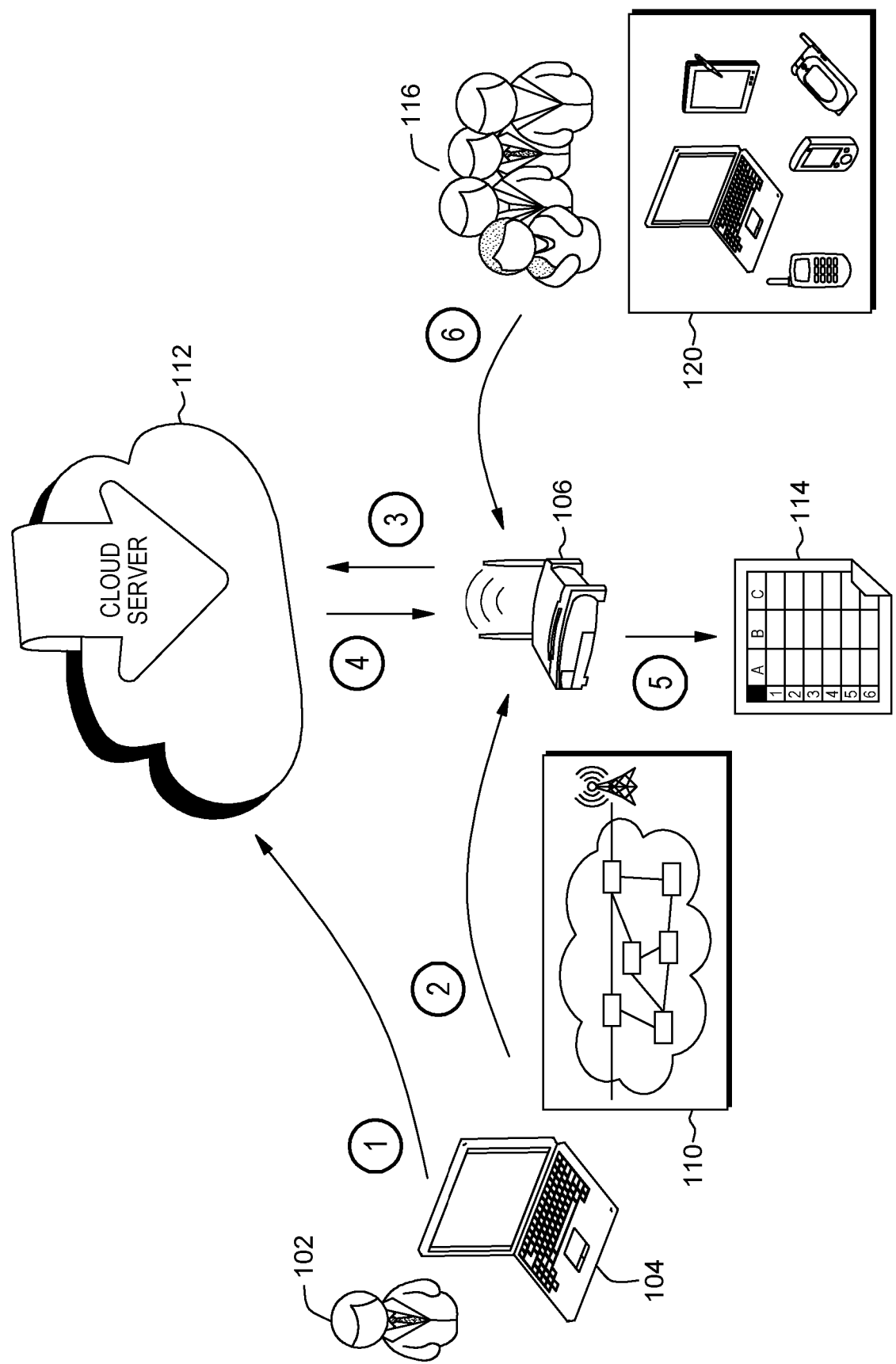
FIG. 1 illustrates a method and system in accordance with an embodiment of the invention.

FIG. 1 illustrates a method and system 100 having controlled automated crowd sourced networking in accordance with an embodiment of the invention. Generally, FIG. 1 shows a user 102, a user device 104, a router 106 that controls access to a wireless network 110, a cloud service 112, relationship table 114, and a group 116 of friends or contacts of user 102. FIG. 1 also shows a group of communication devices 120 that these friends or contact may use.

System 100 allows users of devices having an automated crowd sourced networking feature to use additional information for the purpose of determining the strength of a relationship with a contact, before sharing a wireless network with that contact.

In system 100, this additional information is used to calculate a relationship score, which is uploaded to a cloud service 112 connected to a router 106 or wireless access point via the Internet. The router 106 or access point downloads and caches a table 114 of relationship scores which are used to evaluate requests for network access.

Embodiments of the invention enhance service providers' capabilities to store and process additional data points about a user so as to evaluate the strength of relationships between people. This information will be used to determine whether a relationship exceeds the threshold for sharing of WiFi authentication keys.

More specifically, at step 1 of FIG. 1, social relationship strength scores are uploaded to cloud service 112, and at step 2, device 104 connects to Wifi router 106. At step 3, router 106 queries cloud service 112 for relationship strength entries; at step 4, the cloud service 112 sends the table 114 to router 106; and the router, at step 5, adds entries to its cache. At step 6, friends 116 of user 102 request access to network 110 via an automated crowd source networking feature. The router 106 allows this access only if the entry in the router cache is above the allowed threshold. Router 106 includes or is provided with the processing memory ability needed to perform the processing and data storage described herein.

As will be understood by those of ordinary skill in the art, a variety of devices may be used as first user device 104. For example, this device may be a laptop computer, a notebook computer, a cellular phone, a personal digital assistant, or other suitable mobile communication or entertainment device. For illustrative purposes, the user device 104 is shown as a mobile computing device, although it is understood that the device 104 can be different types of devices; and for example, the first device 104 can also be a non-mobile computing device such as a server, a desktop computer, or a workstation.

Second user devices 120 may also comprise or include a wide range of specific devices. For instance, these devices may also include a laptop computer, a notebook computer, a cellular phone, a personal digital assistant, or other suitable mobile communication or entertainment device. Second user devices can include mobile and non-mobile computing devices such as a server, a desktop computer, or a workstation.

Wireless network 110 can span and represent a variety of specific types of networks. Satellite communication, cellular communication, Bluetooth, Infrared Data Association standard (IrDA), wireless fidelity (WiFi) and worldwide interoperability for microwave access (Wi MAX) are examples of wireless communications that can be included or used in embodiments of the invention. Further, network 110 can traverse a number of network topologies and distances. For example, network 110 can include direct connection personal area network (PAN), local area network (LAN), metropolitan area network (MAN), wide area network (WAN), or combinations thereof.

A wide range of data and algorithms may be used as, or to determine, the relationship strength entries. For example, in embodiments of the invention, the types of data may include:
1. email message headers;
2. contacts for services other than Facebook, Skype, and outlook.com via a standard API (e.g., Google, Yahoo, Linked In, iCloud);
3. SMS/MMS headers; and
4. device location data (GPS information from smart phones, wearable devices, laptop computers, tablets).

FIG. 2 shows a table 200 identifying a multitude of data types 202 and a number of devices, represented at 204. This table also includes, for each of these devices, scores 206 for these data types and a relationship strength 210 determined from these scores.

A wide range of algorithms and procedures may be used to calculate a relationship strength value.

For a service provider (e.g., the automatic crowd sourced network feature) to determine whether to grant access, the system evaluates the data described above, as well as other data the crowd sourced network feature has access to, to see if a threshold of interactions is met. In embodiments of the invention, the method may take into account the following metrics:
1. email message headers;
2. SMS/MMS headers;
3. Shared Facebook connection (existing);
4. Mutual Skype contacts (existing);
5. Mutual outlook.com contacts (existing);
6. Recency of the connection or mutual state of contact (newer relationships may have lower value);
7. Shared location data (frequently being in the same location at the same time may have higher value);
8. Frequency of interaction via Facebook, Skype, email, SMS, other electronic means (more frequent communication and communication over multiple means may have higher value; in embodiments of the invention, communications must be bidirectional to prevent spammers from overcoming the threshold).

The system assigns point values to each of these interactions, with the sum of these point values being evaluated as the strength of the relationship. The system then stores this table and caches the table locally on the network router or access point.

Embodiments of the invention also provide a method for network administrator or users to set the required threshold value to be met. The system allows the owner of the wireless network to set the minimum required relationship strength threshold value to be met before sharing the network key. Optionally, the system could be configured to allow the end user to set the strength threshold. In the case that both the user and the network administrator have set conflicting relationship strength thresholds, the owner of the network (network administrator) setting would take precedence.

Figure 3:
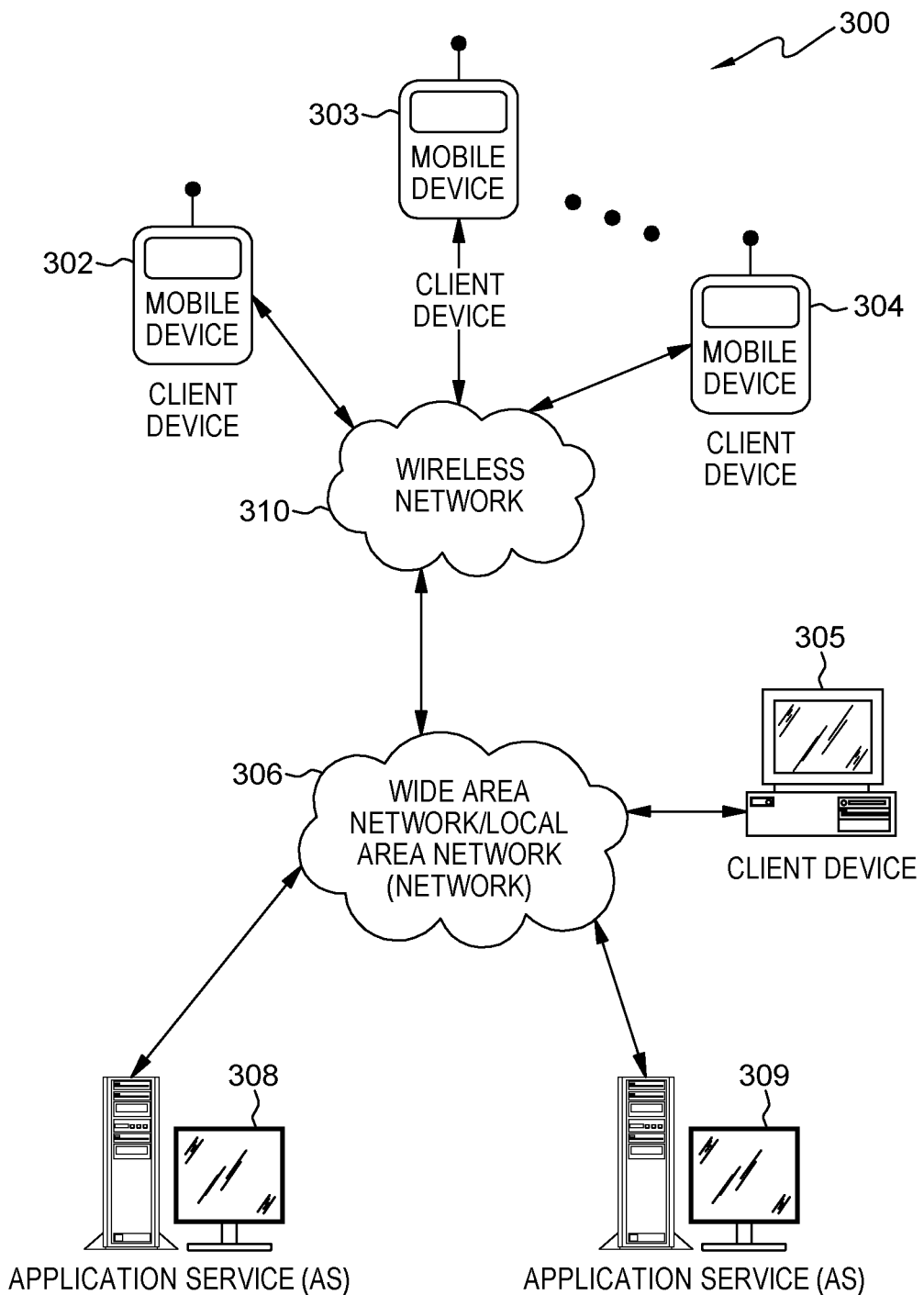
FIG. 3 depicts a computer network environment that may be used in embodiments of the invention.

FIG. 3 shows components of an exemplary computer network environment 300 that may be used in embodiments of the invention. Not all the illustrated components may be required to practice the invention, and variations in the arrangement and type of the components may be made without departing from the spirit or scope of the invention. As shown, system 300 of FIG. 3 includes local area networks ("LANs")/wide area network 306, wireless network 310, mobile devices 302-304, client device 305, and application services 308-309.

Generally, mobile devices 302-304 may include virtually any portable computing device that is capable of receiving and sending a message over a network, such as networks 306 and wireless network 310. Such devices include portable devices, such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 302-304 typically range widely in terms of capabilities and features.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 302-304 may each receive messages sent from AS 308-309, from one of the other mobile devices 302-304, or even from another computing device. Mobile devices 302-304 may also send messages to one of application services 308-309, to other mobile devices, or to client device 305, or the like. Mobile devices 302-304 may also communicate with non-mobile client devices, such as client device 305, or the like.

Wireless network 310 is configured to couple mobile devices 302-304 and its components with network 306. Wireless network 310 may include any of a variety of wireless sub-networks that may further overlay stand-alone ad-hoc networks, and the like, to provide an infrastructure-oriented connection for mobile devices 302-304. Such sub-networks may include mesh networks, Wireless LAN (WLAN) networks, cellular networks, and the like.

Network 306 is enabled to employ any form of computer readable media for communicating information from one electronic device to another. Also, network 206 can include the Internet in addition to local area networks (LANs), wide area networks (WANs), direct connections, such as through a universal serial bus (USB) port, other forms of computer-readable media, or any combination thereof.

Application services 308-309 include virtually any device that may be configured to provide an application service. Such application services or simply applications include, but are not limited to, email applications, search applications, video applications, audio applications, graphic applications, social networking applications, text message applications, or the like. In one embodiment, application services 308-309 may operate as a web server. However, application services 308-309 are not limited to web servers.

Those of ordinary skill in the art will appreciate that the architecture and hardware depicted in FIG. 3 may vary.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of sharing a crowd sourced wireless network, wherein a first user uses a first device to access a specified wireless network, the first device includes an application to grant automatically access to the specified wireless network to all of a defined group of people, and the first device determines relationship scores for said group of people, the method comprising:
   restricting said automatic grant of access to the specified wireless network by,
   when one person of said group of people requests access to the specified wireless network, a network control obtaining a determined strength of a defined relationship between the first user and said one person, said determined strength being determined based on the relationship scores determined by the first device, and granting said one person access to the specified wireless network only if the determined strength of the defined relationship meets one or more set criteria; and
   wherein:
   the first device uploads a series of relationship strength scores to a server; and
   the obtaining the determined strength of a defined relationship between the first user and said one person of the group of people includes the network control receiving said series of relationship strength scores from said server.

2. The method according to claim 1, wherein the network control receiving said series of relationship strength scores from said server includes the network control requesting said series of relationship strength scores from the server in response to the first user accessing the specified wireless network.

3. The method according to claim 1, wherein:
   the first device maintains relationship strength scores for said defined group of people for determining the strength of the defined relationship between the first user and the defined group of people;
   the first device uploads the relationship strength scores to a server;
   the restricting said grant of automatic access includes the network control downloading from said server a table including the relationship strength scores for the defined group of people.

4. The method according to claim 3, wherein the downloading from said server a table including the relationship strength scores for the defined group of people includes the network control downloading the table from the server in response to the first user accessing the specified wireless network.

5. The method according to claim 3, wherein said relationship strength scores include:
   first scores based on defined emails between the first user and said group of people;
   second scores based on defined social media relationships between the first user and said group of people; and
   third scores based on lengths of defined relationships between the first user and said group of people.

6. The method according to claim 1, wherein the determined strength of the defined relationship comprises a strength value for the defined relationship.

7. The method according to claim 6, wherein the granting said one person of the group of people access to the network includes granting said one person access to the network only if the strength value for the defined relationship exceeds a set threshold.

8. The method according to claim 6, wherein the set threshold is set by the first user.

9. The method according to claim 7, wherein:
   the specified network has an administrator for administering the specified network; and the set threshold is set by the administrator of the specified network.

10. A system for sharing a crowd sourced wireless network, wherein a first user uses a first device to access a specified wireless network, the first device includes an application to grant automatically access to the specified wireless network to all of a defined group of people, and the first device determines relationship scores for said group of people, the system comprising:
   one or more processor units;
   memory including computer program instructions that, when executed by the one or more processing units, cause the one or more processing units to perform the steps of:
   restricting said automatic grant of access to the specified wireless network by,
   when a person of said group of people requests access to the specified wireless network, a network control obtaining a determined strength of a defined relationship between the first user and said person, said determined strength being determined based on the relationship scores determined by the first device, and granting said person access to the specified wireless network only if the determined strength of the defined relationship meets one or more set criteria; and wherein:
      the first device uploads a series of relationship strength scores to a server; and
      the obtaining the determined strength of a defined relationship between the first user and said person of the group of people includes the network control receiving said series of relationship strength scores from said server.

11. The system according to claim 10, wherein:
   the obtaining the determined strength of a defined relationship between the first user and said person of the group of people further includes the network control requesting said series of relationship strength scores from the server in response to the first user accessing the specified wireless network.

12. The system according to claim 10, wherein:
   the first device maintains relationship strength scores for said defined group of people for determining the strength of the defined relationship between the first user and the defined group of people;
   the first device uploads the relationship strength scores to a server; and
   the restricting said grant of automatic access includes the network control downloading from said server a table including the relationship strength scores for the defined group of people.

13. The system according to claim 12, wherein the downloading from said server a table including the relationship strength scores for the defined group of people includes the network control downloading the table from the server in response to the first user accessing the specified wireless network.

14. The system according to claim 10, wherein:
   the determined strength of the defined relationship comprises a strength value for the defined relationship; and
   the granting said one person of the group of people access to the network includes granting said one person access to the network only if the strength value for the defined relationship exceeds a set threshold.

15. A computer program product for sharing a crowd sourced wireless network, wherein a first user uses a first device to access a specified wireless network, the first device includes an application to grant automatically access to the specified wireless network to all of a defined group of people, and the first device determines relationship scores for said group of people, the computer program product comprising:
   a computer readable storage medium having program instructions embodied therein, the program instructions executable by a computer to cause the computer to perform the method of:
   restricting said automatic grant of access to the specified wireless network by,
   when a person of said group of people requests access to the specified wireless network, a network control obtaining a determined strength of a defined relationship between the first user and said person, said determined strength being determined based on the relationship scores determined by the first device, and granting said person access to the specified wireless network only if the determined strength of the defined relationship meets one or more set criteria; and wherein:
      the first device uploads a series of relationship strength scores to a server; and
      the obtaining the determined strength of a defined relationship between the first user and said person of the group of people includes the network control receiving said series of relationship strength scores from said server.

16. The computer program product according to claim 15, wherein:
   the obtaining the determined strength of a defined relationship between the first user and said person of the group of people further includes the network control requesting said series of relationship strength scores from the server in response to the first user accessing the specified wireless network.

17. The computer program product according to claim 15, wherein:
   the first device maintains relationship strength scores for said defined group of people for determining the strength of the defined relationship between the first user and the defined group of people;
   the first device uploads the relationship strength scores to a server; and
   the restricting said grant of automatic access includes the network control downloading from said server a table including the relationship strength scores for the defined group of people.

18. The computer program product according to claim 17, wherein the downloading from said server a table including the relationship strength scores for the defined group of people includes the network control downloading the table from the server in response to the first user accessing the specified wireless network.

19. The computer program product according to claim 15, wherein:
   the determined strength of the defined relationship comprises a strength value for the defined relationship; and
   the granting said one person of the group of people access to the network includes granting said one person access to the network only if the strength value for the defined relationship exceeds a set threshold.

* * * * *